Patented Jan. 5, 1932

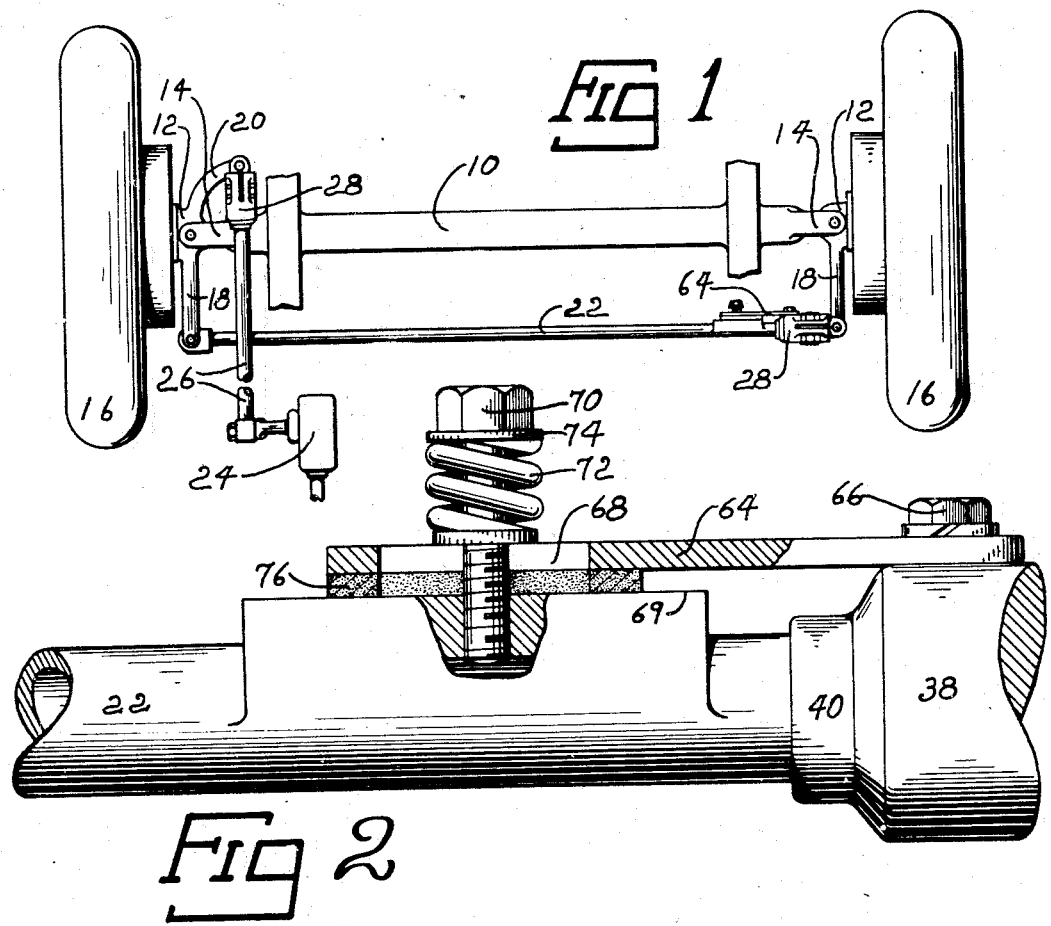
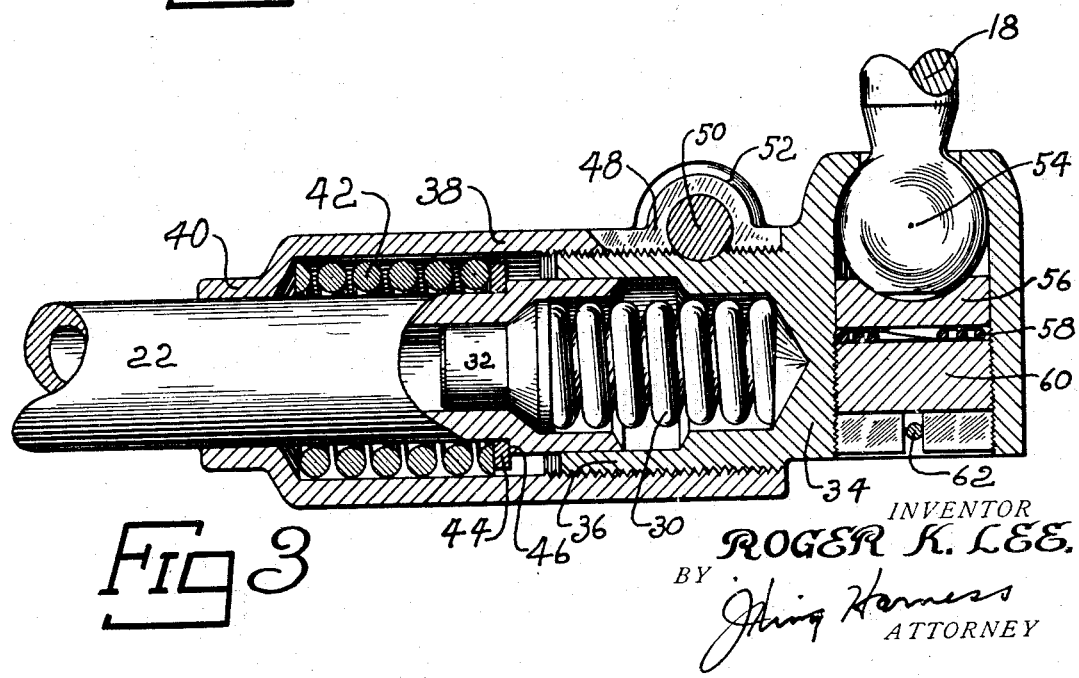

1,840,115

UNITED STATES PATENT OFFICE

ROGER K. LEE, OF DETROIT, MICHIGAN, ASSIGNOR TO CHRYSLER CORPORATION, OF HIGHLAND PARK, MICHIGAN, A CORPORATION OF DELAWARE

STEERING MECHANISM

Application filed September 21, 1927. Serial No. 221,097.

This invention relates to vehicle steering mechanism and has reference more particularly to means for eliminating synchronous wheel vibration commonly called "wheel shimmy."

When the front wheels of a vehicle are pivoted on the axle and connected together by a rigid tie rod, the vibration of one wheel synchronizes with the vibration of the other wheel causing both wheels to oscillate together. This condition is dangerous as well as undesirable.

It is an object of the present invention to provide means for preventing synchronous vibration by breaking up the vibration periods so that in the event that one wheel vibrates the other wheel may not vibrate in phase with it. From this point of view the invention contemplates resisting the vibration of each wheel by a resilient means; the means resisting one wheel having a different rate of vibration than the other means. As an example, a resilient connection is provided between one wheel and an actuating member and a resilient connection of a different rate of vibration is provided between the two wheels.

Another object of the invention is to provide a frictional device between the moving parts of one of the resilient connections, illustrated as applied to the connection between the wheels.

A further object is to provide a simple, inexpensive and practical means for accomplishing the above objects without alteration of the steering mechanism other than its connecting links, and which may be readily applied to the steering mechanism of a vehicle after it has been manufactured.

The above and other objects of the invention will more fully appear from the following description taken in connection with the accompanying drawings in which:

Fig. 1 is a plan view of a part of the steering mechanism of a vehicle which is provided with an embodiment of my invention.

Fig. 2 is an enlarged view showing in detail the application of a friction device between the moving parts of the connecting link.

Fig. 3 is a longitudinal sectional view thru the resilient portion of the connection.

Referring to the illustrated embodiment of my invention and particularly to Fig. 1, the reference numeral 10 designates the front axle of an automobile provided with steering knuckles 12 pivoted in yokes 14 at the opposite ends of the axle. Wheels 16 are mounted on spindles carried by the knuckles 12. Projecting arms 18 and 20 are secured to the knuckles 12 and a tie rod 22 is adapted to have its opposite ends pivotally connected to the arms 18. The actuating member or steering gear is illustrated as at 24 and a drag link 26 forms an operative connection between the actuating member and the arm 20 of the knuckle. Longitudinal movement of the drag link 26 causes angular movement of the one knuckle and it in turn causes angular movement of the other knuckle thru the tie rod 22.

A resilient member 28 has been provided in the tie rod 22 and the drag link 26. The two members have been shown interchangeable and are alike in construction except for the amount of resiliency. It is important that the two members have a different rate of vibration determined by the rate of vibration of each resilient connection. The resiliency of the connection determines the rate of vibration; that is, the more resilient the connection is, the lower its rate of vibration and the less resilient connection causes a higher rate of vibration. It has been found that by providing a less resilient member in the drag link than in the tie rod a satisfactory result is obtained. By this arrangement the wheel adjacent the drag link is vibrating at a higher rate than the other wheel.

Referring particularly to Fig. 3, wherein the resilient member has been shown in detail, the rod 22 has an opening formed in its outer end adapted to receive the inner end of a spring 30, abutting against a plug or shoulder 32. The opposite end of the spring 30 is received in the open end of the attaching member 34. The attaching member is provided with a sleeve portion 36 adapted to fit over the end of the rod 22 to prevent relative radial movement but free for axial movement. Screwthreaded on the outer periphery of the sleeve 36 is a sleeve 38 having a depressed end portion 40 adapted to fit the rod 22 and to form an abutment for the outer end of another spring 42.

The spring 30 is made from the same diameter wire as the spring 42. The diameter of the coil for the spring 30 is smaller than the diameter of the coil 42. It will be understood that the spring 30 is more rigid than the spring 42, owing to their difference in diameter. The stiff spring 30 maintains the axial relation between the two wheels. For an oscillation to be transmitted from one wheel to the other through the spring member, it is necessary that the spring have a sufficiently high rate to move the mass of the wheel at the rate of oscillation of the first member. If the return spring 42 is not of a sufficiently high rate to bring the wheel back at the same rate that it went over, it is impossible to obtain a harmonic oscillation. It is not necessary that the spring 30 be in contact with the members at all times.

The inner or opposite end of the spring 42 abuts against an annular washer 44 which engages a shoulder 46 on the rod 22. It will be understood that by this arrangement of parts, the spring 30 resiliently urges the rod and member 34 apart and the spring 42 resiliently urges them together thus providing a construction resilient in either direction and rigid radially. The threaded end of the sleeve 38 is slotted as at 48 and a bolt 50 extending thru bosses 52 at opposite sides of the slot 48 is adapted to lock the sleeve in adjusted position on the sleeve 36.

The end of the attaching member is shown adapted to receive a ball 54 on the end of the arm 18 or 20. The ball is held in place by a wear member 56 which is resiliently held against the ball by a spring 58. A nut 60 forms an adjustable abutment for the spring 58 and the pin 62 locks the nut 60 in position.

As a means for dampening out the vibrations of one connecting member, I have provided a friction member adapted to be carried by one of the moving members and in engagement with the other member. As shown in Fig. 2 a supporting arm 64 has one of its ends secured to the attaching sleeve 38 by a bolt 66 and its opposite end is slotted as at 68. A flat face portion 69 is secured to the rod 22 and a bolt 70 screw threaded in the rod extends thru the slots 68. A spring 72 is held between a washer 74 engaging the head of the bolt and the arm 64. Suitable friction material 76 is placed between the flat face 69 and the arm 64, carried by the latter. By this arrangement a variable tension and resistance may be made between the moving parts of the link. If desired, the face plate may be eliminated and the friction material 76 may engage the rod 22.

It will be understood that the wheel 16 at the right of the drawing may vibrate at a given rate depending on the vibration rate of the resilient member in the rod 22 and that the wheel at the left of the drawing may vibrate at a different rate depending on the rate of vibration of the resilient member in the drag link 26. By this arrangement the vibration periods of both wheels do not synchronize and a "wheel shimmy" is eliminated.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. A connection of the class described comprising, a rod having an open end, an abutment in said open end, a shoulder on the outer periphery of said open end, springs extending in opposite directions one adapted to engage said shoulder and the other adapted to engage said abutment, a member movable independently of said rod adapted to engage the opposite end of the spring engaging said abutment, and a member carried by said last named member adjustable with respect thereto adapted to engage the opposite end of the spring engaging said shoulder.

2. A connection of the class described comprising, a rod having an open end, an abutment in said open end, a shoulder on the outer periphery of said open end, springs extending in opposite directions one adapted to engage said shoulder and the other adapted to engage said abutment, a member movable independently of said rod adapted to engage the opposite end of the spring engaging said abutment, a member carried by said last named member adjustable with respect thereto adapted to engage the opposite end of the spring engaging said shoulder, and means at the opposite ends of said rod and said member for pivotally securing them to members adapted to be moved by the connection.

ROGER K. LEE.